United States Patent
Binford

[11] Patent Number: 5,917,723
[45] Date of Patent: Jun. 29, 1999

[54] METHOD AND APPARATUS FOR TRANSFERRING DATA BETWEEN TWO DEVICES WITH REDUCED MICROPROCESSOR OVERHEAD

[75] Inventor: Charles D. Binford, Wichita, Kans.

[73] Assignee: LSI Logic Corporation, Milpitas, Calif.

[21] Appl. No.: 08/445,828

[22] Filed: May 22, 1995

[51] Int. Cl.$^6$ .................................................. G05B 15/00
[52] U.S. Cl. ............... 364/131; 364/140.01; 395/200.31; 395/842
[58] Field of Search ..................................... 364/131, 140, 364/145, 185, 200, 187, 364, 134, 748, 130–147; 395/829, 800, 200.38–200.41, 825–827, 840–844, 200.31, 200.35, 821, 842; 371/9

[56] References Cited

U.S. PATENT DOCUMENTS

| | | | |
|---|---|---|---|
| 4,123,794 | 10/1978 | Matsumoto | 364/101 |
| 4,181,936 | 1/1980 | Kober | 364/200 |
| 4,212,057 | 7/1980 | Devlin et al. | 364/200 |
| 4,298,928 | 11/1981 | Etoh et al. | 364/200 |
| 4,327,408 | 4/1982 | Frissell et al. | 395/183.19 |
| 4,410,944 | 10/1983 | Kronies | 364/200 |
| 4,445,174 | 4/1984 | Fletcher | 364/200 |
| 4,628,436 | 12/1986 | Okamoto et al. | 364/131 |
| 4,775,976 | 10/1988 | Yokoyama | 371/9 |
| 4,959,768 | 9/1990 | Gerhart | 364/187 |
| 5,099,446 | 3/1992 | Sako et al. | 364/748 |
| 5,225,974 | 7/1993 | Mathews et al. | 364/140 |
| 5,301,351 | 4/1994 | Jippo | 395/800 |
| 5,331,538 | 7/1994 | DiGiulio | 364/134 |
| 5,398,324 | 3/1995 | Matida et al. | 395/842 |
| 5,504,669 | 4/1996 | Wakabayashi et al. | 364/131 |
| 5,511,227 | 4/1996 | Jones | 395/829 |
| 5,588,110 | 12/1996 | DeKoning et al. | 395/182.03 |

FOREIGN PATENT DOCUMENTS

| | | |
|---|---|---|
| 0598541 | 11/1993 | European Pat. Off. |
| 9407196 | 3/1994 | WIPO . |

*Primary Examiner*—William Grant
*Assistant Examiner*—Sheela S. Rao
*Attorney, Agent, or Firm*—Wayne P. Bailey; Daniel N. Fishman

[57] ABSTRACT

A method for transferring data from a first device to a second device where the second device has a main data processor and a secondary processor associated therewith. The method includes the steps of (1) transferring a data stream having a control portion and a data portion from the first device to the second device, and (2) processing the data portion with the secondary processor in accordance with the control portion without interrupting the main data processor. A multi-controller apparatus which is useful for practicing the method is also disclosed.

16 Claims, 3 Drawing Sheets

| | | Byte Stream for CACHE READ/WRITE BUFFER | | | |
|---|---|---|---|---|---|
| | | Byte 3 | Byte 2 | Byte 1 | Byte 0 |
| A' | L_Word 0 | MOVE_DATA_OUT | count of script bytes (n*8) | | | ~44 |
| B' | L_Word 1 | MOVE_DATA_IN/OUT | byte count of data block 1 | | | ~48 |
| B'' | L_Word 2 | address of data block 1 | | | | ~50 |
| B' | L_Word 3 | MOVE_DATA_IN/OUT | byte count of data block 2 | | | ~48 |
| B'' | L_Word 4 | address of data block 2 | | | | ~50 |
| B' | L_Word 5 | MOVE_DATA_IN/OUT | byte count of data block 3 | | | ~48 |
| B'' | L_Word 6 | address of data block 3 | | | | ~50 |
| B' | L_Word w | ..... | ..... | | |
| B'' | L_Word x | ........ | | | |
| C' | L_Word y | RETURN script instructions | | | |
| C'' | L_Word z | 00 | 00 | 00 | 00 |
| D' | L_Word (n*2)+2 | byte 3 | byte 2 | byte 1 | byte 0 |
| D' | L_Word (n*2)+3 | byte 7 | byte 6 | byte 5 | byte 4 |
| D' | L_Word (n*2)+... | ... | ... | ... | ... |
| E' | ... | ... | ... | ... | ... |
| F' | ... | ... | ... | ... | ... |

*FIG. 2*

| | | Byte Stream for CACHE INVALIDATE | | | |
|---|---|---|---|---|---|
| | | Byte 3 | Byte 2 | Byte 1 | Byte 0 |
| A' | L_Word 0 | count of addr/data pairs (n) | | | | ~52 |
| B' | L_Word 1 | address of data word 1 | | | | ~54 |
| B'' | L_Word 2 | Data word 1 | | | | ~56 |
| B' | L_Word 3 | address of data word 2 | | | | ~54 |
| B'' | L_Word 4 | Data word 2 | | | | ~56 |
| B' | L_Word 5 | address of data word 3 | | | | ~54 |
| B'' | L_Word 6 | Data word 3 | | | | ~56 |
| ... | ... | ... | | | |
| ... | ... | ... | | | |
| B' | L_Word (2*n-1) | address of data word n | | | |
| B'' | L_Word (2*n) | Data word n | | | |

*FIG. 3*

METHOD AND APPARATUS FOR TRANSFERRING DATA BETWEEN TWO DEVICES WITH REDUCED MICROPROCESSOR OVERHEAD

BACKGROUND OF THE INVENTION

The present invention relates generally to a method and apparatus for transferring data between two devices, and more particularly a method and apparatus for transferring data between two devices with reduced microprocessor overhead.

Typically, when data is transferred from an initiator device to a target device, a hardware interrupt is generated in the target device which must be serviced by a data processing unit such as a microprocessor of the target device. In particular, the microprocessor must stop executing a software application in order to service the interrupt thus increasing microprocessor overhead.

Write-back caching is an exemplary environment where transferring data from an initiator device to a target device without interrupting a data processor of the target device is useful. In order to provide meaning to the term "without interrupting", it should be noted that the phrase "without interrupting a data processor of the target device", means without generating a hardware interrupt to the data processor such as a microprocessor in response to a data transfer. Thus, the data processor of the target device has no knowledge of the data transfer and any data transfer-related microprocessor overhead is prevented.

Write-back caching refers to a method of executing write requests where a host computer transfers write request data to a caching disk array controller which then transfers the write request data to storage media. Depending upon the particular write-back caching strategy being implemented by the controller, he write request data can either be written immediately to the storage media, or he write request data can be temporarily stored in a cache memory as unwritten or "dirty" data and then "flushed" or written to the storage media at some later point in time. In both cases, the controller sends back status information to the host computer indicating that the write request is complete so that the host computer can continue executing a software application. What is meant herein by the use of the term "dirty data" is data that is located in cache memory which has not yet been written to storage media. To provide meaning to the following terms "flush", "flushed" or "flushing" which are used herein, it should be appreciated that the act of "flushing" data means writing dirty data to storage media.

In bursty host environments, such as when the host computer intermittently has a large number of write requests, write-back caching permits the host computer to quickly transfer all of the write request data to cache memory thus increasing the performance of the host computer by reducing the host computer's overhead in executing a large number of write requests. The increased performance of the host computer when utilizing write-back caching is accompanied by an increased risk of data loss in the event of a controller failure or the like which may occur subsequent to sending the host computer status information but prior to actually writing the data to storage media. Intermediate levels of write request data protection have been developed which involve the use of controller pairs that mirror the write request data for redundancy purposes prior to sending status information to the host computer.

When using two controllers to mirror write request data, a primary controller receives a write request from a host computer. The primary controller then instructs a target or alternate controller to store a copy of the write request data into a cache memory of the alternate controller for redundancy purposes before the primary controller sends status information to the host computer, and before the primary controller places the data on the storage media. The microprocessor of the target controller must typically process the write request data which, as previously mentioned, involves the use of interrupts or other overhead tasks such as sending microprocessor-level acknowledgments, thus reducing performance of the alternate controller.

What is needed therefore is a method for transferring data between two devices in which performance of a target device is not substantially reduced.

SUMMARY OF THE INVENTION

In accordance with one embodiment of the present invention, there is provided a method for transferring data from a first device to a second device, with the second device having a main data processor and a secondary processor. The method includes the steps of (1) transferring a data stream having a control portion and a data portion from the first device to the second device, and (2) processing the data portion with the secondary processor in accordance with the control portion without interrupting the main data processor.

Pursuant to another embodiment of the present invention, there is provided a method for transferring data from a first device to a second device, with the second device having a main processor and a secondary processor. The method includes the steps of (1) transferring a quantity write request data from a host device to the first device, (2) allocating a memory area within the second device for use by the first device, and (3) copying the write request data from the first device to the memory area within the second device without interrupting the main processor of the second device.

Pursuant to yet another embodiment of the present invention, there is provided a multi-controller apparatus which includes a first controller, and a second controller having a main processor and a secondary processor. The apparatus also includes a channel connecting the first controller to the second controller, and a mechanism for sending a data stream across the channel from the first controller to the secondary processor of said second controller without interrupting the main processor of the second controller.

It is therefore an object of the present invention to provide a new and useful method for transferring data between two devices in which performance of a target device is not substantially reduced.

It is another object of the present invention to provide an improved method of mirroring data for redundancy purposes.

It is a further object of the present invention to provide a new and useful apparatus for transferring data between two devices in which performance of a target device is not substantially reduced.

The above and other objects, features, and advantages of the present invention will become apparent from the following description and the attached drawings.

BRIEF DESCRIPTION OF THE DRAWINGS

FIG. 2 is a chart illustrating a data stream format containing ASIC-specific instructions and write request data to be mirrored to an alternate controller;

FIG. 3 is a chart illustrating a data stream format for invalidating a mirrored data representation stored in the alternate controller.

DETAILED DESCRIPTION OF THE PREFERRED EMBODIMENT

Figure 1:
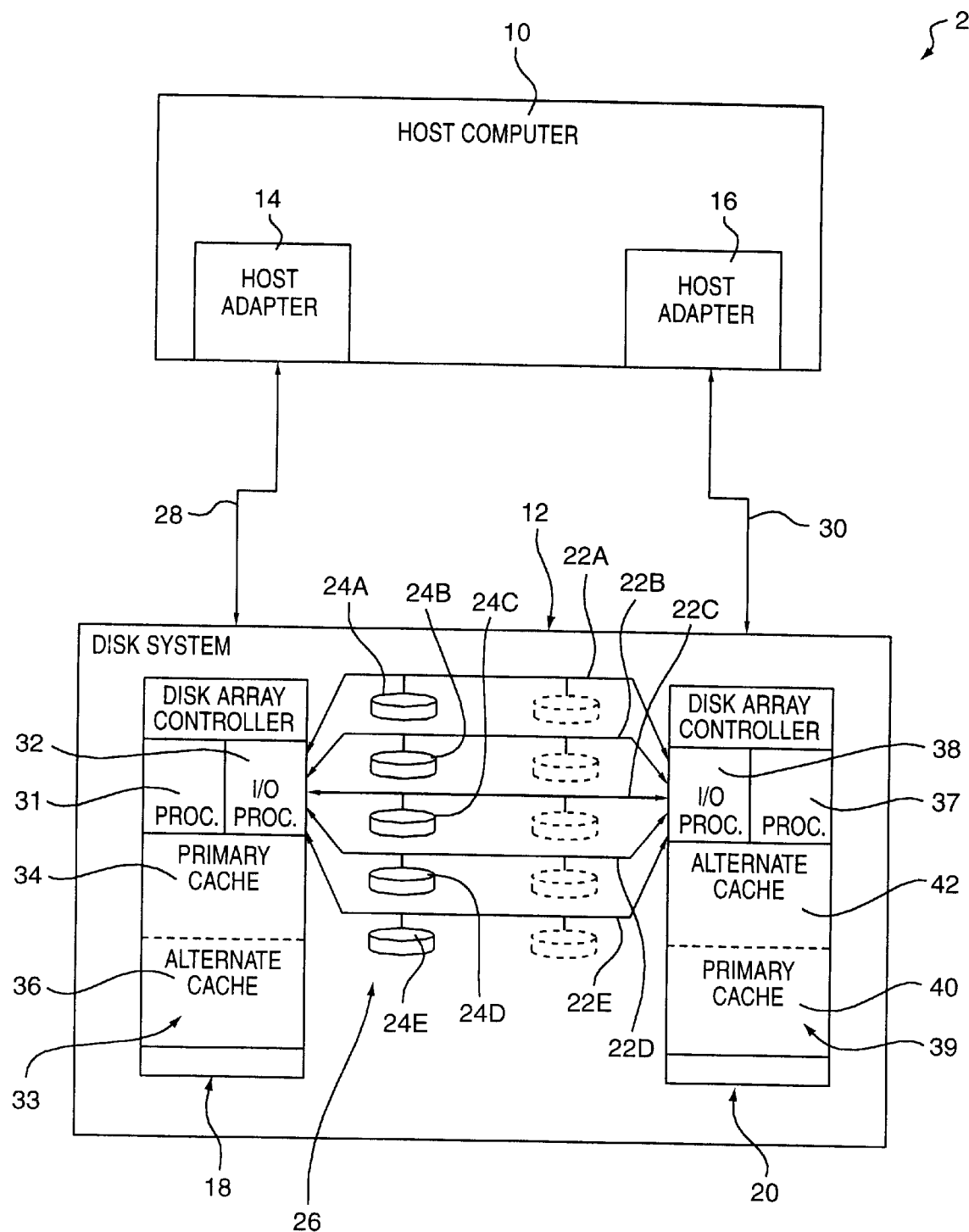
FIG. 1 is a block diagram of a computer system with a multi-controller disk array apparatus of the present invention which mirrors data in accordance with the data transfer method of the present invention.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown a computer system 2 comprising a host computer 10 and a peripheral disk drive apparatus 12 connected to the host computer 10. The host computer 10 includes a first host adapter 14 and a second host adapter 16 which both function to interface the host computer 10 to various peripheral devices such as the disk drive apparatus 12.

The disk drive apparatus 12 includes a first caching disk array controller 18, a second caching disk array controller 20, a plurality of back-end buses or channels such as SCSI channels 22A–22E which interconnect the first controller 18 to the second controller 20, and may include one or more storage mediums such as a data disk 24A–24E connected to each of the respective buses 22A–22E. SCSI is an acronym for a Small Computer System Interface which defines a communications protocol standard for input/output devices. The first version of the standard, SCSI-1, is described in ANSI Document No. X3.131-1986 which is incorporated herein by reference. The SCSI-1 specification has been upgraded with an expanded interface referred to as SCSI-2. The SCSI-2 specification is described in ANSI Document No. X3.131-1994 which is also incorporated herein by reference. In the described embodiment, there are five disks 24A–24E which cooperate to form a one-column disk array 26, and which are individually connected to the controllers 18, 20 via the buses 22A–22E, respectively. The disk array 26 incorporates a design termed "Redundant Array of Inexpensive Disks" (RAID). Five levels of RAID design, termed RAID-1 through RAID-5, are known in the art and are described in the publication titled "A Case for Redundant Arrays of Inexpensive Disks (RAID)" by David A. Patterson, Garth Gibson and Randy H. Katz; University of California Report No. UCB/CSD 87/391, December 1987, which is incorporated herein by reference. It should be appreciated that the disk array 26 can include additional columns of disks connected to the respective buses 22A–22E. For example, a 5 by 6 disk array comprising thirty (30) disk drives can be formed by connecting five (5) additional disks to each bus 22A–22E, respectively.

The host computer 10, and more particularly, the host adapters 14, 16 are connected to the respective disk array controllers 18, 20 via separate buses such as host SCSI buses 28 and 30. The first controller 18 includes a main data processor 31 such as a conventional Intel 486 microprocessor, a secondary processor 32 such as an input/output processor and a cache memory 33. The cache memory 33 can be partitioned into at least two separate areas comprising a primary cache memory area 34 and an alternate cache memory area 36. Likewise, the second controller 20 includes a main data processor 37 such as a conventional Intel 486 microprocessor, a secondary processor 38 such as an input/output processor and a cache memory 39 which is partitioned into at least two separate areas comprising a primary cache memory area 40 and an alternate cache memory area 42.

The input/output processors 32, 38 execute ASIC-specific (Application Specific Integrated Circuit) instructions independent from controller firmware or other microprocessor-executable code which is executed by the respective microprocessors 31, 37. One example of a suitable input/output processor is the SCSI Input/Output Processor (SIOP) 53C825 chip manufactured by Symbios Logic Inc. of Fort Collins, Colorado. The 53C825 input/output processor executes SCRIPTS instructions which are an ASIC-specific instruction set specifically designed for controlling the 53C8XX family of Symbios Logic Inc. products.

The controllers 18, 20 can operate in one of two modes, passive-active or dual-active. In the dual-active mode of operation, both controllers 18, 20 have portions of their respective cache memories 33, 39 allocated for exclusive use by the other controller. Thus, in the dual-active mode, both controllers 18, 20 function as a primary controller and an alternate controller. More specifically, the primary cache memory area 34 is assigned to controller 18 for use during cache read/write requests from the host computer 10, and the alternate cache memory area 36 is assigned to controller 20 for use in mirroring write request data which is stored in the primary cache memory area 40 of controller 20. Controller 20 is responsible for managing the write request data that it mirrors or stores in the alternate cache memory area 36. In essence, the alternate controller 20 is being used as a remote memory for the controller 18 and the controller 18 can update or receive data from the remote memory.

Likewise, the primary cache memory area 40 is assigned to controller 20 for use during cache read/write requests from the host computer 10, and the alternate cache memory area 42 is assigned to controller 18 for use in mirroring write request data which is stored in the primary cache memory area 34 of controller 18. Controller 18 is responsible for managing the write request data that it mirrors into the alternate cache memory area 42.

The alternate cache memory areas 42, 36 are allocated to the respective controllers 18, 20 during the system configuration phase of start-up operations for the computer system 2. It should be appreciated that the alternate cache memory area 42 is assigned the same corresponding memory addresses as assigned to the primary cache memory area 34, and that the alternate cache memory area 36 may be assigned the same corresponding memory addresses as assigned to the primary cache memory area 40 thus simplifying mirroring operations by avoiding the need for virtual memory mapping operations.

In the passive-active mode of operation, one of the controllers, such as controller 18, functions as a primary controller which receives read/write requests from the host computer 10 while the other controller, controller 20, functions as an alternate controller which provides cache memory for mirroring the write request data under the direction of the primary controller 18 as described above with regard to the dual-active mode of operation.

It should be appreciated that the alternate cache memory area 36 does not have to be the same size as the primary cache memory area 40, and that the alternate cache memory area 42 does not have to be the same size as the primary cache memory area 34. By way of example, the alternate cache memory area 42 has to only be large enough to handle all of the mirrored write request data that controller 18 wants to store. At any given time, the primary cache memory area 34, and similarly, the primary cache memory area 40, has X % of read cache, Y % of write cache and Z % of unused memory allocated thereto, where X+Y+Z=100% of the primary cache memory area 34. If the maximum amount of write request data (Y % of write cache) that can be stored in the primary cache memory area 34 is less than 100% of the primary cache memory area 34, then the alternate cache memory area 42 can be smaller than the primary cache memory area 34. That is, the alternate cache memory area 42 need only be as large as the amount of the primary cache memory area 34 allocated for write caching.

For ease of description, further reference will be limited to data transfers between the primary cache memory area 34 and the alternate cache memory area 42. However, it is to be understood that data transfers between the primary cache memory area 40 and the alternate cache memory area 36 occur in an analogous manner.

The controller 18 receives a write request from the host computer 10 via the first host adapter 14 and the bus 28. After the controller 18 stores the write request data in the primary cache memory area 34, the controller 18 then directs the write request data to be mirrored to the alternate cache memory area 42 of controller 20. More specifically, the controller 18 builds SCRIPTS instructions which precede the actual write request data to be mirrored. The SCRIPTS instructions and the write request data are then sent to the input/output processor 38 via one of the buses 22A–22E. The input/output processor 38 executes the SCRIPTS instructions which direct the input/output processor 38 to transfer the actual write request data to the alternate cache memory area 42 without any intervention from the microprocessor 37. It should be appreciated that while no microprocessor-level interrupts occur, the bandwidth of an internal bus (not shown) of controller 20 is affected, as is the bandwidth of the buses 22A–22E, when the write request data is sent to, and executed by, the controller 20.

Referring now to FIG. 2 there is shown a chart depicting an exemplary data stream 43 representing a control portion containing SCRIPTS or ASIC-specific control instructions and a data portion containing the actual write request data that is sent by the controller 18 to the input/output processor 38 when transferring data to the alternate cache memory area 42. The controller 18 builds or assembles the SCRIPTS or ASIC-specific control instructions for execution by the input/output processor 38 in accordance with the instruction format shown in FIG. 2. The SCRIPTS instructions are identified as A', B', B", C' and C", and the actual write request data is identified as D', E' and F'. The A' SCRIPTS instruction is a single MOVE_DATA_OUT SCRIPT instruction with a byte count field 44, but no address field. The A' SCRIPTS instruction is used to indicate how many SCRIPTS instruction bytes precede the actual write request data D'–F'. The byte count for the A' SCRIPTS instruction is derived from the length of a "scatter-gather" list (discussed further below). That is, the "scatter-gather" list is used to determine how many SCRIPTS instructions that it will take to transfer the write request data.

The B' and B" SCRIPTS instructions represent a set of either MOVE_DATA_IN or MOVE_DATA_OUT SCRIPTS instructions. A MOVE_DATA_IN SCRIPTS instruction transfers write request data stored in the alternate cache memory area 42 to the primary cache memory area 34. A MOVE_DATA_OUT SCRIPTS instruction transfers write request data stored in the primary cache memory area 34 to the alternate cache memory area 42. There will be n MOVE_DATA_IN and/or n MOVE_DATA_OUT SCRIPTS instructions, where n represents the number of scatter-gather structures (discussed further below) representing blocks of write request data stored in either the primary cache memory area 34 (for a MOVE_DATA_OUT SCRIPTS instruction), or in the alternate cache memory area 42 (for a MOVE_DATA_IN SCRIPTS instruction).

The B' SCRIPTS instructions contain a field 46 which identifies the instruction as either a MOVE_DATA_IN instruction, or a MOVE_DATA_OUT instruction. The B' SCRIPTS instruction also contains a byte count field 48 which represents the number of bytes of write request data that are stored in the particular cache memory area 34 or 42. The B" SCRIPTS instruction contains an address field 50 which represents the address of the particular cache memory block where the write request data is stored. The count and address information for the instructions B' and B" comes directly from the scatter-gather list (discussed further below) which is built and maintained by the controller 18 for use in transferring data in and out of the cache memory 34.

The C' and C" SCRIPTS instructions represent a RETURN command which instructs the input/output processor 38 that the mirroring of write request data to alternate cache memory area 42 (MOVE_DATA_OUT instruction), or the return of write request data from the alternate cache memory area 42 (MOVE_DATA_IN instruction) is complete, and that control should return to the normal input/output processor 38 operating program. The C" SCRIPTS instruction contains a presently unused parameter field.

A conventional "scatter-gather" list (not shown) is comprised of a number of conventional "scatter-gather" structures (not shown). The "scatter-gather" list sequentially links together a continuous or logical block of data that may be stored in separate blocks throughout the cache memory 34. A separate "scatter-gather" structure is associated with each separate block of data that may be stored throughout the cache memory 34. An exemplary "scatter-gather" structure contains four fields, namely, a local address field containing the beginning address of a particular block of data stored in the primary cache memory area 34, a remote address field containing the beginning address of where the particular block of data is, or should be, stored in/retrieved from the alternate cache memory area 42, a length field containing the length in bytes of the block of data, and a pointer field which points to the address of the next scatter-gather structure.

In order to transfer the data stream 43 to the input/output processor 38, the controller 18 provides a "scatter-gather" list for the write request data stored in the primary cache memory area 34 to a conventional common SCSI driver (CSD) (not shown) resident within the controller 18. The CSD is a known software module which controls data transfers across the buses 22A–22E. In order to also send the SCRIPTS instructions A'–C" across the buses 22A–22E ahead of the write request data D'–F', an extra "scatter-gather" structure (not shown) must be added by the CSD to the beginning of the "scatter-gather" list. The extra "scatter-gather" structure points to the beginning memory address location where the SCRIPTS move instructions A'–C" are stored, and the subsequent "scatter-gather" structures each point to a beginning memory address location for the sequential blocks of write request data D'–F' that are to be mirrored to the alternate cache memory area 42. The CSD will utilize the "scatter-gather" list to build the SCRIPTS instructions A'–C", and to transfer a data stream comprising both the SCRIPTS instructions A'–C" and the write request data D'–F' across at least one of the buses 22A–22E in the format shown in FIG. 2.

Once the data stream 43 has been sent across the bus 22, the input/output processor 38 stores the write request data D'–F' in the alternate cache memory area 42 in accordance with a MOVE_DATA_OUT SCRIPTS instruction B', B". Alternatively, the input/output processor 38 places the write request data stored in the alternate cache memory area 42 on the bus 22 in accordance with a MOVE_DATA_IN SCRIPTS instruction B', B".

FIG. 3 shows a graph illustrating an alternate data stream 51 comprising control instructions and data that can be sent by the controller 18 to the input/output processor 38. In the described embodiment, after write request data has been mirrored in the alternate cache memory area 42, and after the controller 18 has written the write request data to storage media, the controller 18 invalidates the mirrored write request data so that the memory space in the alternate cache memory area 42 can be reused. Thus, the controller 18 sends the data stream 51 to the input/output processor 38 in order to invalidate the mirrored write request data stored in alternate cache memory area 42.

As shown in FIG. 3, the data stream 51 comprises a count block A' having a field 52 which indicates the number (n) of address/data pairs that follow the count block A'. Each address/data pair includes an address block B' having a field 54 containing address information, and a data block B" having a field 56 containing data. The data in each field 56 is stored in the alternate cache memory area 42 beginning at the address in field 54 of address block B'. Each address/data pair is used to update the controller 20 regarding the status of a particular mirrored write request data block stored in the alternate cache memory area 42. It should be noted that the address/data pairs B', B" do not contain SCRIPT code as in the data stream 43. Instead, each address/data pair B', B" contains updating information which is in a form that can be interpreted by a SCRIPTS routine executed by the input/output processor 38 without interrupting the microprocessor 37.

Figure 4:
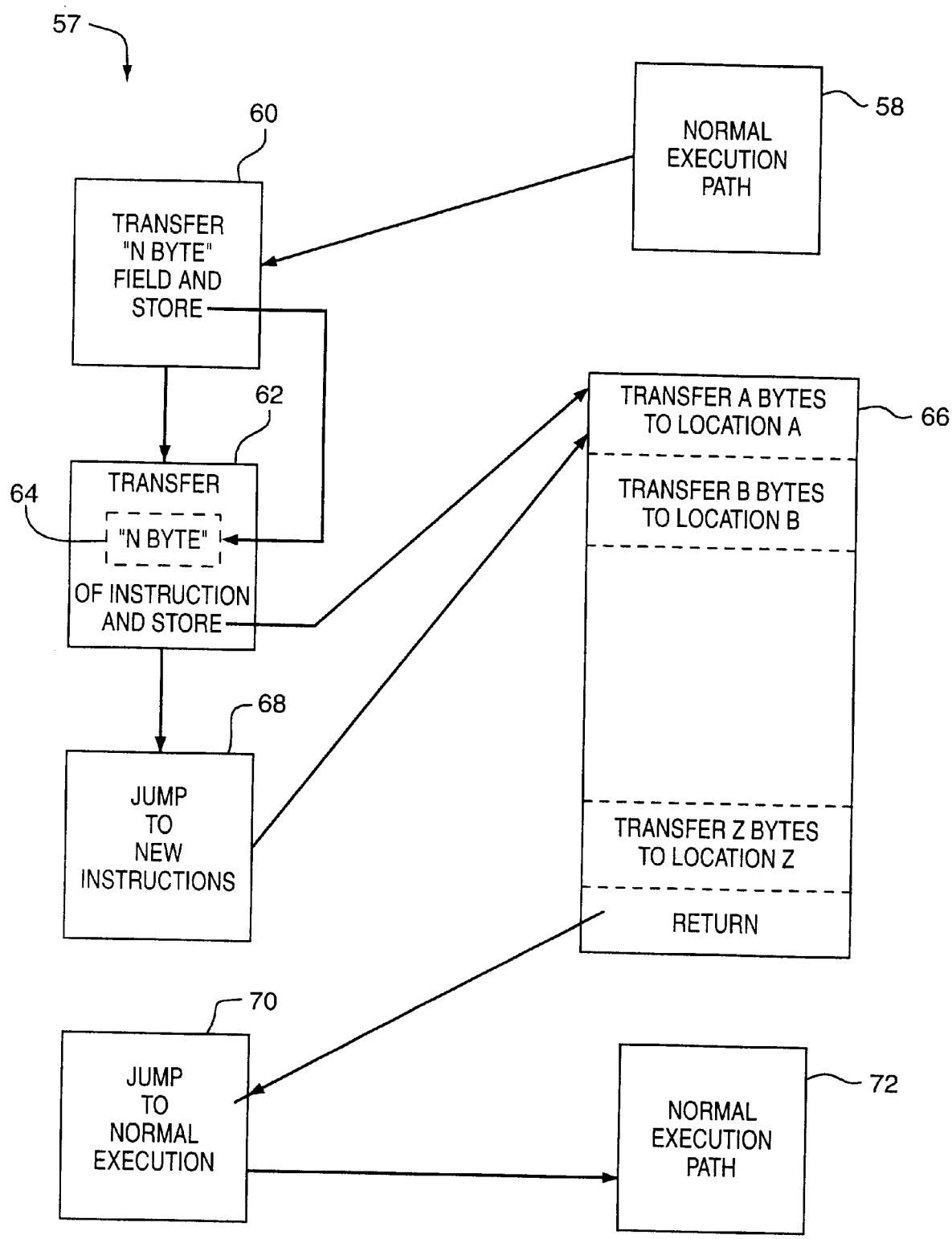
FIG. 4 is a flowchart illustrating a routine to be executed by the alternate controller when mirroring write request data.

Referring now to FIG. 4, there is shown a flowchart illustrating an exemplary SCRIPTS routine or path 57 that is executed by the input/output processor 38 when processing the data stream 43. In step 58, the input/output processor 38 operates in a conventional execution path wherein the input/output processor 38 processes a selection after receiving a WAIT_FOR_SELECT instruction. During processing, the input/output processor 38 specifically checks a command descriptor block (CDB) for a cache read/write mirror transfer command. If a cache read/write mirror transfer command is present, the input/output processor 38 jumps from the conventional execution path to the SCRIPTS routine 57 beginning at step 60.

In step 60, the input/output processor 38 is instructed to transfer the first four bytes of the data stream 43 into a "n bytes" field 64 in step 62. That is, the SCRIPTS instruction in step 60 is a Data Move instruction that causes the "n bytes" field 64 in the second Move Data SCRIPTS instruction in step 62 to be overwritten with the byte count data (n*8) contained in the byte count field 44 of the SCRIPTS instruction A' in the data stream 43. In step 62, the input/output processor 38 executes the second Move Data SCRIPTS instruction wherein the next (n*8) bytes of the data stream 43 which represent the SCRIPTS instructions B'–C" (MOVE_DATA_IN and/or MOVE_DATA_OUT and RETURN SCRIPTS instructions), are written to a predetermined area such as a scratch buffer 66 which is allocated by the controller 20.

When the third SCRIPTS instruction in step 68 is executed, input/output processor 38 control is passed to the first, and then subsequent SCRIPTS instructions B', B" which were written into the buffer 66 in step 62. When the input/output processor 38 executes a B', B" MOVE_DATA_OUT SCRIPTS instruction, the number of write request data bytes specified in the byte count field 48 of the B' SCRIPTS instruction are taken from the data stream 43 and written into the alternate cache memory 42 beginning at the address specified in the address field 50 of the B" SCRIPTS instruction. When the input/output processor 38 executes a B', B" MOVE_DATA_IN SCRIPTS instruction, the number of write request data bytes specified in the byte count field 48 of the B' SCRIPTS instruction are retrieved from the alternate cache memory area 42 and placed on one or more of the buses 22A–22E. The specified number of data bytes are taken from the alternate cache memory 42 beginning from the address specified in the address field 50 of the B" SCRIPTS instruction.

After all of the B' and B" SCRIPTS instructions are executed by the input/output processor 38, the C' and C" SCRIPTS instructions are executed which return control to the fourth SCRIPTS instruction in step 70 back in the SCRIPTS routine 57. In step 70, the fourth SCRIPTS instruction is executed which ends the SCRIPTS routine 57 and returns control to the conventional execution path of the input/output processor 38 in step 72.

After the write request data is successfully mirrored to the alternate cache memory area 42 of controller 20, the controller 18 will send status information to the host computer 10 indicating that the write request was successful. The controller 18 can then write the data to the disk array 26 in accordance with the particular write-back caching algorithm selected. If the controller 18 happens to fail, or a fault occurs prior to actually writing the data to the disk, array 26, the write request data can be recovered from the alternate cache memory area 42 of controller 20. More specifically, controller 20 can interpret and rebuild the write request data stored the alternate cache memory area 42.

When mirrored write request data is invalidated, the controller 18 sends the data stream 51 to the input/output processor 38. A SCRIPTS routine (not shown) similar to the routine shown in FIG. 4 is executed by the input/output processor 38 to transfer the data information specified in the data block B" of the data stream 51 to the alternate cache memory area 42 beginning at the address specified in the address block B' of the data stream 51.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

For example, it should be appreciated that at least one bus 22 could interconnect the controllers 18 and 20 without having a disk 24 connected thereto. Thus, the controller 18 could be connected to the controller 20 via a dedicated channel for use in transferring a data stream, wherein the data stream can include a control portion and a data portion.

In addition, it should be appreciated that the present invention is not limited to mirroring write request data in a second device without generating a hardware interrupt. More specifically, a first device could send a data stream to a second device without generating a hardware interrupt in the second device wherein the data stream contains only control information or a message.

One example is a read request wherein a first device instructs a second device to retrieve data stored in the second device. A data stream sent across a channel from the first device to the second device could contain ASIC-specific control instructions that instruct the second device to retrieve mirrored write request data from an alternate cache memory area in the second device, and to send the mirrored write request data back across the channel to the first device, all without generating a hardware interrupt to a data processor of the second device. Thus, a data stream sent from a first device to a second device across a channel could contain information other than write request data, and if any ASIC-specific control instructions are in the data stream, the ASIC-specific control instructions could direct a secondary processor of the second device to perform in ways other than just storing data in a memory area of the second device.

What is claimed is:

1. A method for transferring data from a first controller to a second controller, comprising the steps of:

transferring a data stream having a control portion and a data portion from the first controller to the second controller, the second controller having a main data processor and a secondary processor, wherein the control portion contains a variable length instruction portion; and executing said variable length instruction portion with the secondary processor to process the data portion without interrupting the main data processor.

2. The method of claim 1, wherein the transferring step includes the steps of:

assembling the control portion in the first controller; and sending the control portion and the data portion from the first controller to the secondary processor of the second controller.

3. The method of claim 2, further comprising the step of:

allocating a memory area within the second controller for use by the first controller.

4. The method of claim 3, wherein the processing step includes the step of:

storing the data portion in the memory area within the second controller without generating an interrupt to the main processor of the second controller.

5. The method of claim 3, wherein the processing step includes the step of:

sending data from the memory area within the second controller from the first controller without generating an interrupt to the main data processor of the second controller.

6. The method of claim 1, wherein the first controller and the second controller are each a caching disk array controller.

7. The method of claim 1, wherein the secondary processor is an input/output processor.

8. A method for transferring data from a first controller to a second controller, comprising the steps of:

transferring write request data from a host device to the first controller;

allocating a memory area within the second controller for use by the first controller, the second controller having a main processor and a secondary processor; and copying the write request data, by using the secondary processor to execute a control instruction from the first controller, to the memory area within the second controller without interrupting the main processor of the second controller, wherein said control instruction contains a variable length instruction portion.

9. The method of claim 8, wherein the copying step includes the steps of:

assembling a control instruction in the first controller; and sending a data stream including the control instruction and the write request data from the first controller to the secondary processor of the second controller; and processing the write request data with the secondary processor in accordance with the control instruction without generating an interrupt to the main processor.

10. The method of claim 8, wherein the first controller and the second controller are each a caching disk array controller.

11. The method of claim 8, wherein the secondary processor is an input/output processor.

12. A multi-controller apparatus comprising:

a first controller;

a second controller having a main processor and a secondary processor;

a channel connecting said first controller to said second controller; and means for sending a data stream including a control portion containing a variable length instruction portion across said channel from said first controller to the secondary processor of said second controller without interrupting the main processor of said second controller, wherein said secondary processor executes said variable length instruction portion.

13. The apparatus of claim 12, wherein the second controller includes a memory area allocated for exclusive use by the first controller.

14. The apparatus of claim 13 wherein said data stream includes data, and said secondary controller includes means for storing the data in said memory area in accordance with said variable length instruction portion.

15. The apparatus of claim 13, wherein said secondary controller includes means for sending data stored in said memory area across said channel to said first controller in accordance with said variable length instruction portion.

16. A program storage device readable by a machine, tangibly embodying a program or instructions executable by the machine to perform method steps for transferring data from a first controller to a second controller, said method steps comprising:

transferring a data stream having a control portion and a data portion from the first controller to the second controller, the second controller having a main data processor and a secondary processor, wherein the control portion contains a variable length instruction portion; and executing the variable length instruction portion with the secondary processor to process the data portion without interrupting the main data processor.

* * * * *